Patented Feb. 22, 1944

2,342,275

UNITED STATES PATENT OFFICE 2,342,275

DRILLING MUD

Charles C. Hedges, College Station, and Preston E. Chaney, Beaumont, Tex., assignors to Sun Oil Company, Philadelphia, Pa., a corporation of New Jersey No Drawing. Application July 8, 1939, Serial No. 283,372

10 Claims. (Cl. 252—8.5)

The present invention relates to improvements in drilling muds, and more particularly to addition agents which prevent flocculation of the mud when salt water is encountered during drilling operations.

In drilling wells by the rotary method it is customary to circulate a mud fluid down through the drill pipe and up between the drill pipe and the wall of the bore hole in order to carry the cuttings to the surface and to strengthen the wall of the bore hole by the deposition of mud from the fluid thereon. In certain areas where medium or high pressures are encountered in the producing sands, it is necessary to use drilling muds weighted with barytes, ferric oxide or the like, such muds weighing as much as 13 pounds per gallon. These drilling muds are colloidal in character and are subject to flocculation or precipitation when salt water is encountered during the drilling operation or is for any purpose added to the drilling fluid. Flocculation or precipitation may be desirable in certain cases where it is desired to have the mud penetrate certain porous formations during the drilling in order to seal off these formations, but in most instances is not desirable as it causes precipitation of the mud as well as the cuttings in the mud pit or sump.

We have discovered that flocculation or precipitation on admixture with salt water can be prevented by the addition of certain protective colloids to the mud and that the wall building properties of the mud will be enhanced by such treatment.

It is therefore an object of the invention to provide a drilling mud having added thereto certain protective colloids which prevent flocculation or precipitation on admixture with salt water and which muds have increased wall building properties.

Briefly, the invention comprises the addition of an alkali metal salt of alginic acid or ammonium alginate to a drilling mud for the purpose of preventing flocculation or precipitation and for enhancing the wall-building properties of the mud.

In accordance with our invention, we add to the drilling muds, as a protective colloid, up to about 4 per cent by weight of sodium alginate, which is the sodium salt of alginic acid, obtained from the algins in seaweed (kelp). By the use of sodium alginate drilling muds can be produced which, if filtered at 100 pounds per square inch pressure for thirty minutes through a filter of 7 square inches in area, in the standard mud performance tester, will release less water than the best drilling mud now in use.

As an example, 1 per cent by weight of sodium alginate was added to a natural drilling mud which originally had a thirty minute filtrate (at 100 pounds per square inch pressure) of 24 cc. with a ¼" filter cake. However, after being treated, the mud had a filtrate of 7.5 cc. with a $\frac{1}{16}$" cake under the same conditions.

When used to maintain satisfactory mud viscosity and wall-building properties, where salt water is encountered, the sodium alginate must be protected from the action of calcium salts by treating the mud with an electrolyte which will precipitate calcium ions. As an electrolyte sodium carbonate may be used.

As a further example, where applied to relatively heavy mud a suspension of 4 per cent sodium alginate by weight was diluted with an equal volume of saturated sodium carbonate solution and the resultant mud weighted for 11 pounds per gallon with barytes. When the resultant mud was further diluted with 20 per cent of a natural salt water containing 94,500 parts per million of chlorides, the resultant mud had a thirty minute filtrate at 100 pounds per square inch pressure of 9 cc. with a $\frac{1}{32}$" filter cake, such filter cake being especially small for a salt water mud of such weight.

Sodium alginate may also be used to produce wall-building characteristics in sodium silicate muds such as are used when drilling through heaving shales. When so used the sodium alginate should first be suspended in fresh water before addition to the mud. As an example of this use, a sodium silicate mud containing two parts by volume of sodium silicate and 1 part of saturated sodium chloride solution had added thereto 2 per cent by weight of sodium alginate. To the resultant mixture sufficient ferric oxide was added to bring the mud weight to 16 pounds per gallon. The resultant mud had a thirty minute filtrate at 100 pounds per square inch pressure of 4 cc. and a Stormer viscosity of 70 centipoises at 600 R. P. M. which might be considered somewhat high but not unusual for sodium silicate mud of this weight, which is only used for unusual drilling conditions.

While in the specific examples hereinabove given only the addition of sodium alginate has been referred to, the present invention, as before stated, is not restricted to the use of the sodium salt of alginic acid, but includes all the alginates of the alkali metals as well as ammonium alginates. It is therefore to be understood that where in the claims "alkali metal alginate" is referred to, this is meant to include as an equivalent ammonium alginate.

Having described our invention, what we claim and desire to protect by Letters Patent is as follows:

1. A drilling fluid for circulation during drilling containing a weighting material and a substantial quantity of an alkali metal alginate.

2. A drilling fluid containing a weighting material, a substantial quantity of an alkali metal alginate, and an electrolyte capable of precipitating calcium ions.

3. A drilling fluid for circulation during drilling containing a weighting material and a substantial quantity of sodium alginate.

4. A drilling fluid containing a weighting material, a substantial quantity of sodium alginate, and sodium carbonate.

5. A drilling fluid containing a substantial quantity of an alkali metal alginate and sodium silicate.

6. In the art of drilling oil and gas wells with the aid of circulation of a mud fluid, the improvement comprising circulating through the well during drilling a mud fluid containing a weighting material and a substantial quantity of an alkali metal alginate.

7. In the art of drilling oil and gas wells with the aid of circulation of a mud fluid, the improvement comprising circulating through the well a mud fluid containing a weighting material, a substantial quantity of an alkali metal alginate and an electrolyte capable of precipitating calcium ions.

8. In the art of drilling oil and gas wells with the aid of circulation of a mud fluid, the improvement comprising circulating through the well during drilling a mud fluid containing weighting material and a substantial quantity of sodium alginate.

9. In the art of drilling oil and gas wells with the aid of circulation of a mud fluid, the improvement comprising circulating through the well mud fluid containing a weighting material, substantial quantity of sodium alginate, and sodium carbonate.

10. In the art of drilling oil and gas wells with the aid of circulation of a mud fluid, the improvement comprising circulating through the well a mud fluid containing a weighting material, a substantial quanity of an alkali metal alginate and sodium silicate.

CHARLES C. HEDGES.
PRESTON E. CHANEY.